April 22, 1952   J. L. KUEHLTHAU   2,593,900
ARMATURE COIL LEAD ARRANGEMENT FOR REDUCING CORONAS
Filed Dec. 23, 1950
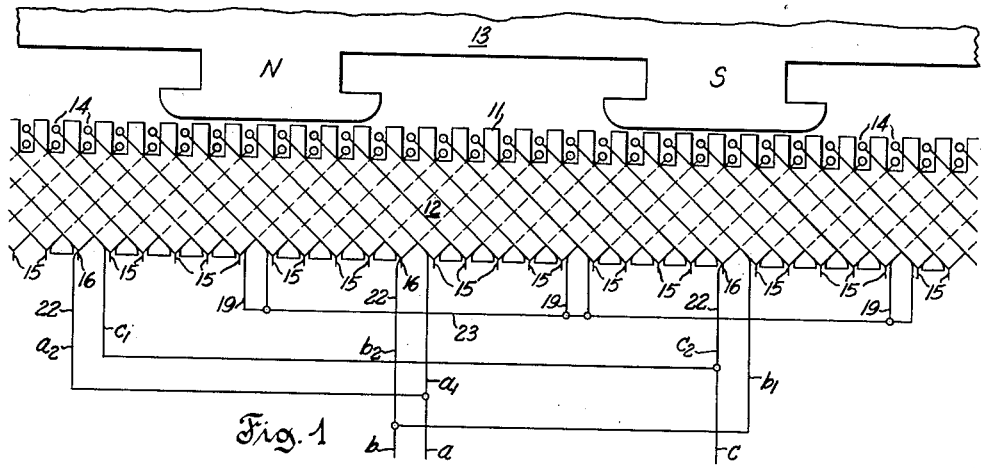
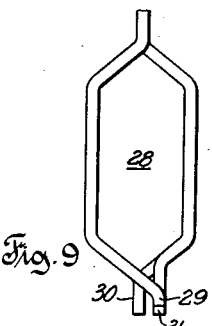 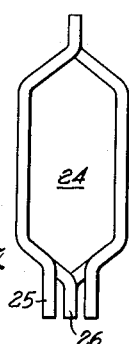 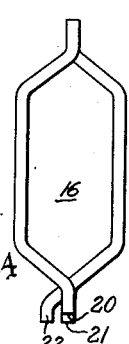 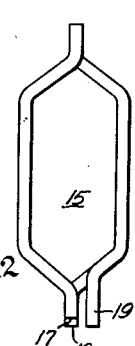
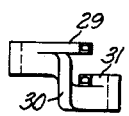 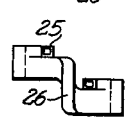 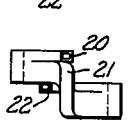 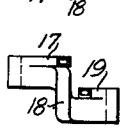
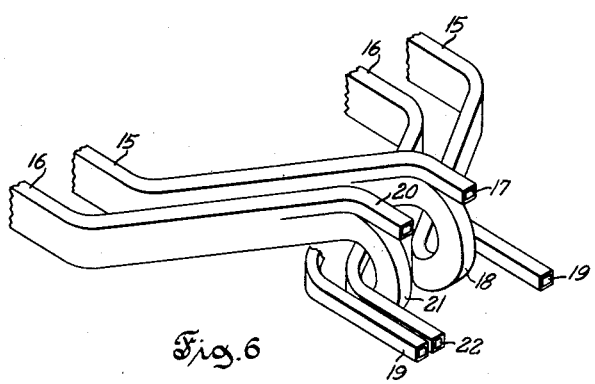
Inventor
John L. Kuehlthau
by T. Lloyd La Fave
Attorney Patented Apr. 22, 1952

2,593,900

UNITED STATES PATENT OFFICE 2,593,900

ARMATURE COIL LEAD ARRANGEMENT FOR REDUCING CORONAS

John L. Kuehlthau, Milwaukee, Wis., assignor to Allis-Chalmers Manufacturing Company, Milwaukee, Wis.

Application December 23, 1950, Serial No. 202,444

6 Claims. (Cl. 171—252)

This invention relates to the elimination of corona in the end turns of windings of high voltage alternating current dynamoelectric machines, particularly to the proper spacing of lead conductors from adjacent coils when their potential difference could cause corona discharge.

In order to avoid the well known dangers of corona discharge in high voltage machines, the spacing between coil sides is generally made sufficiently large to reduce the voltage gradient in the air or gas spaces below that required for corona. However, special provisions must be made to eliminate corona in the end turns of windings of the armature of high voltage machines such as turbogenerators. Because of high rotor speeds in such machines the diameter of the rotor and therefore, the inside diameter of the stator is relatively small, resulting in very close spacing of the stator end turns or the portions of the windings and winding terminals which extend beyond the slotted core iron.

Present winding arrangements include similarly formed coils disposed in the core slots with lead conductors extending similarly from all of the coils. The spacings of the end turns and leads of each coil from the end turns and leads of adjacent coils are generally sufficient to prevent corona discharge. However, in many winding arrangements it happens that the high voltage terminal conductor of one phase group is disposed between a coil of that phase group and an adjacent coil of another phase group. In such cases, because of the limited space for the coils and leads and the symmetrical arrangement thereof, the usual spacing between coil leads and adjacent coils is not sufficient between a high potential coil lead serving as a phase terminal and an adjacent coil of another phase group to insure that the voltage gradient therebetween is below that which may cause corona.

This invention provides increased spacing between such leads and adjacent coils having high potential differences therebetween by relocating certain coil leads from one side to the other side of the end turn portions of their respective coils, thus effecting an arrangement of leads which is not entirely symmetrical about the core.

It is therefore an object of this invention to provide a high voltage dynamoelectric machine having formed coil windings and uniform spacing between end turns thereof with increased spacing between such coil leads and adjacent end turns that have high potential differences to reduce the voltage gradient therebetween below that required for corona discharge.

Other objects and advantages of this invention will be apparent from the following description taken with the accompanying drawings, in which:

Fig. 1 shows a diagrammatic development of the armature winding of a dynamoelectric machine employing form wound coils of uniform pitch embodying the present invention;

Fig. 2 is a plan view of a conventional form wound coil utilized in part of the winding shown in Fig. 1;

Fig. 3 is an end view of the coil shown in Fig. 2;

Fig. 4 is a plan view of a form wound coil according to this invention utilized in conjunction with coils of the form shown in Fig. 2;

Fig. 5 is an end view of the coil shown in Fig. 4;

Fig. 6 is a view in perspective of the lead end portions of a coil of the type shown in Fig. 2 and of an adjacent coil of the type shown in Fig. 4 employed in the armature winding of Fig. 1;

Fig. 7 is a plan view of another conventional form wound coil;

Fig. 8 is an end view of the coil shown in Fig. 7;

Fig. 9 is a plan view of another form wound coil according to this invention preferably to be used in conjunction with coils of the type shown in Fig. 7; and Fig. 10 is an end view of the coil shown in Fig. 9.

Referring to the drawing, the stator member of a two pole, three phase dynamoelectric machine shown developed in Fig. 1 comprises a laminated core 11 and a lap wound armature winding 12. A suitable rotor member 13 provides magnetic poles designated by the letters N and S. The armature winding comprises a plurality of formed coils 15, 16 which are disposed in the slots 14 of the core 11 to form a symmetrically arranged double layer lap winding.

The formed coils 15, 16 shown in Figs. 2, 4 and 6 are diamond shaped, and each consists of a conductor wound to form two or more turns. Coil 15 is a conventionally formed coil having an end turn portion 18 and a first lead 17 which extends from the outer turn of the left or top slot portion of the coil. Lead 17 may be disposed on either side of the end turn portion but preferably is disposed in alignment therewith as shown. A second lead 19 extends from the inside turn of the right or bottom slot portion of the coil. Lead 19 is disposed on the right side of the end turn portion 18, i. e., on the same side thereof as the bottom coil slot portion from which the lead extends.

A first lead 20 of coil 16 is aligned with the end turn portion 21 thereof in the same manner as first lead 17 with the end turn portion 18 of coil 15. Coil 16 has a second lead 22, corresponding to lead 19 of coil 15, which extends from the inside turn of the right or bottom slot portion through the loop defined by the end turn portion 21 of the coil. This second lead is disposed on the left side of the end turn portion 21, i. e., the side thereof opposite to the side of the bottom coil slot portion from which the lead extends.

The armature winding shown in Fig. 1 has coil leads connected for a three phase Y connected winding, with any suitable number of slots and coils per pole per phase, and shown for illustration only as having two coil sides in each slot, five coils in each circuit and circuits in each phase equal to the number of magnetic poles.

The neutral point of each circuit is shown connected to a common conductor 23, and the high potential terminal of each circuit is designated by a letter $a$, $b$ or $c$ corresponding to the phase and by a subscript numeral corresponding to the circuit.

For many winding arrangements it happens that a high potential point such as a terminal of one phase circuit and a coil of a different phase circuit are adjacent one another. Between such high potential points, the potential difference may be sufficient to cause corona discharge. In the armature winding shown in Fig. 1, there would be three such occurrences if all the coils had similar lead arrangements.

In an armature winding having only one type of coil lead arrangement such as that of coil 15, the coil leads will appear symmetrically disposed. Three of the coils have second leads 19 which define phase terminals $a$, $b$ and $c$, which extend from the right sides of their respective end winding portions to the same side of the loop 18 defined thereby, and on the left side of end winding portions of adjacent coils, each of which is of a correspondingly different phase. Leads 19 of all the coils are uniformly spaced from the adjacent coils; where a lead 19 defines terminals, however, such spacing may not be sufficient to reduce the voltage gradient between it and the adjacent coil to prevent corona discharge.

In an armature winding comprising coils 15 and coils 16, according to this invention, additional space is obtained between a high voltage lead and the adjacent high voltage coil of another phase. In the circuit shown, each of the second leads 19 of coils 15 is connected to the first lead of the adjacent coil 15 or 16, and each of the second leads 22 of coils 16 are connected to a first lead of a nonadjacent coil 15 through a high voltage terminal connection. Each of the coils 16 whose second leads 22 define high voltage terminals $a_2$, $b_2$ and $c_2$, has such lead extended through its loop 21 from one side to the other or opposite side thereof. As shown in Fig. 6, each second lead 22 is thus disposed adjacent a second lead 19 of a coil 15 on its left which is in the same phase circuit, and between such adjacent leads the potential difference is relatively small. The spacing between each lead 22 and the adjacent coil on its right, which is in another phase circuit, is greater than the spacing between the loops of adjacent coils. Second leads 22 define high voltage terminals and these leads are relocated with respect to the symmetrical arrangement of second leads 19 so that the potential gradient between each lead 22 and an adjacent coil is reduced below that required for corona discharge.

Armature winding 12 may also comprise coils 16 with, in lieu of coils 15, conventional coils 24 which have a different lead arrangement. Lead 25 is a first lead of coil 24 and is disposed on the left side of its end turn portion 26, i. e., the same side thereof as the coil slot portion from which the lead extends. Coil 16 may similarly have its first lead 20 disposed on the left side of its end turn portion 21 instead of aligned therewith.

Armature winding 12 may further comprise coils 28 substituted for those of coils 15 or 24 which have first leads 17 or 25 connected to high voltage terminals $a_1$, $b_1$ or $c_1$. Each coil 28 has a first lead 29 which is disposed on the right side of end turn portion 30 of its coil. Lead 29 thus is on the side of end turn portion 30 opposite the side on which the coil slot portion from which the lead extends is located and on the same side as the second lead 31. Such an arrangement provides that adjacent coils have their leads separated by at least a coil loop when such leads have high potential difference therebetween.

It will be apparent that the invention is applicable to armature windings having coil lead arrangements other than those shown and described where adjacent coils may have leads with corona causing potential differences therebetween, and that changes or modifications may be made therein without departing from the spirit of the invention or the scope of the appended claims.

It is claimed and desired to secure by Letters Patent:

1. An alternating current dynamoelectric machine having a high voltage armature winding, said winding comprising a plurality of multiturn coils symmetrically disposed to form a lap type winding, each said coil having a first lead and a second lead for connecting said coils in a plurality of circuits, each said circuit having a high potential terminal, those of said second leads which are connected to first leads of adjacent said coils being similarly disposed on one side of the end turn portions of their respective coils, those of said second leads which are connected to first leads of nonadjacent said coils to form said high potential terminals being disposed on the other side of the end turn portions of their respective coils.

2. An alternating current dynamoelectric machine having a high voltage armature winding, said winding comprising a plurality of multiturn coils symmetrically disposed to form a double layer lap type winding, each said coil having an end winding portion defining a loop and having a first lead and a second lead extending therefrom for connecting said coils in a polyphase winding defining a plurality of circuits, each said circuit having a lead defining a high potential terminal, each of said second leads which are connected to said first leads of adjacent said coils extending to one side of its said coil loop, and each of said second leads which are connected to first leads of nonadjacent said coils for defining one of said high voltage terminals extends through its said coil loop to the other side thereof, whereby the spacing between each said second lead connected to a said high voltage phase circuit terminal and the loop of the adjacent coil of another phase circuit is greater than the spacing between loops of adjacent said coils.

3. An alternating current dynamoelectric machine having a high voltage armature winding, said winding comprising a plurality of coils symmetrically disposed to form a lap type winding, each said coil having an end turn portion with a first lead and a second lead extending therefrom, means connecting said leads to connect said coils in a polyphase circuit, each said phase circuit having a first or a second lead defining a high voltage terminal, all of said first leads being similarly disposed with respect to the end turn portions of their respective coils, those of said second leads not defining any of said high voltage terminals being similarly disposed on one side of the end turn portions of their respective coils, and those of said second leads defining said high voltage terminals being disposed on the other side of the end turn portions of their respective coils.

4. An alternating current dynamoelectric machine having a high voltage armature winding comprising a plurality of multiturn coils symmetrically disposed to form a lap winding, each said coil having a first lead and a second lead for connecting said coils in a polyphase winding defining a plurality of phase circuits each of which has a high voltage terminal, each terminal coil of one-half of said circuits has a second lead connected to one of said high voltage terminals, those of said second leads connected to said high voltage terminals being disposed on one side of the end turn portions of their respective coils, and the other said second leads being disposed on the other side of the end turn portions of their respective coils.

5. An alternating current dynamoelectric machine comprising a slotted magnetic core having a high voltage armature winding connected in polyphase circuits, said winding comprising a plurality of multiturn coils disposed in said slots symmetrically about said core, each said coil having an end winding portion and a first lead and a second lead extending therefrom, said end winding portions being uniformly spaced from each other, a pair of adjacent coils being connected in different phase circuits, one of said pair of adjacent coils having a first lead connected to a terminal of one said phase circuit and the other of said pair having a second lead connected to a terminal of a different said phase circuit, said terminals having high potential difference therebetween, said second lead connected to one of said terminals being disposed on the side of its end winding portion remote from said adjacent coil of said pair.

6. An alternating current dynamoelectric machine comprising a slotted magnetic core having a high voltage armature winding, said winding comprising a plurality of multiturn coils disposed in said slots and connected to form a lap type winding defining a plurality of circuits, said coils having leads and end turn portions defining adjacent loops, a pair of adjacent coils in different said circuits, said leads of each said coil of said pair being spaced from the other said coil of said pair a distance not less than the spacing between said loops of said pair of adjacent coils.

JOHN L. KUEHLTHAU.

REFERENCES CITED

The following references are of record in the file of this patent:

UNITED STATES PATENTS

| Number | Name | Date |
| --- | --- | --- |
| 1,832,700 | Gay | Nov. 17, 1931 |